United States Patent [19]

Albenda

[11] 4,073,068
[45] Feb. 14, 1978

[54] TEACHING LIGHT

[76] Inventor: Abraham R. Albenda, 1831 59th St., Brooklyn, N.Y. 11204

[21] Appl. No.: 802,808

[22] Filed: June 2, 1977

[51] Int. Cl.² ............................................. G09B 7/06
[52] U.S. Cl. ........................................ 35/9 B; 35/9 D
[58] Field of Search ........................ 35/9 B, 9 C, 9 D

[56] References Cited

U.S. PATENT DOCUMENTS

| | | | |
|---|---|---|---|
| 1,881,242 | 10/1932 | Prentice | 35/9 B |
| 3,106,027 | 10/1963 | Thelen | 35/9 C |
| 3,562,927 | 2/1971 | Moskowitz | 35/9 C UX |
| 3,763,574 | 10/1973 | Rose | 35/9 D |
| 3,795,989 | 3/1974 | Greenberg et al. | 35/9 B |

*Primary Examiner*—William H. Grieb
*Attorney, Agent, or Firm*—Flynn & Frishauf

[57] ABSTRACT

A teaching device having a base member with a metallic sheet thereon and a power source and indicator lamp assembly electrically connected to the metallic sheet. A clip is provided on the base member, also connected to the power source, and spaced from the metallic sheet. A question and answer folder is mounted on the base member with the clip in electrical connection with a metallic foil which is part of the question and answer folder. The question and answer folder has a control opening in registration with a correct answer indicia whereby finger pressure on the correct answer indicia causes an electrical connection to be made between the metallic foil of the question and answer sheet and the matallic sheet on the base member to complete the electrical circuit to the indicator lamp. The question and answer folder is openable so as to be easily mounted and electrically connected to the contact member of the base member and the portions of the question and answer folder are connected together so as to always be in registration with each other.

10 Claims, 6 Drawing Figures

TEACHING LIGHT

The present invention relates to teaching devices, and more particularly to a teaching device having questions and answers indicated thereon and which gives immediate response to correct answers by illumination of a light.

The object of the present invention is to provide a simple teaching device utilizing electrical light indication of correct answers and which has a simple structure and simple circuitry.

It is a further object of the invention to provide such a teaching device useable with a plurality of question and answer elements which are easily exchanged in the device.

SUMMARY OF THE INVENTION

According to the present invention, an electrical teaching apparatus comprises a substantially rigid base member made of electrically insulating material; an electrically conducting layer partially covering a face of the base member; an electrically conductive contact member on the base member and spaced from said electrically conductive layer; and a source of power coupled between the contact member and the electrically conducting layer. The apparatus further comprises a question and answer member adapted to overlie the electrically conducting layer and to engage the contact member, the question and answer member including an electrically insulating bottom layer control sheet which has at least one aperture therein, an electrically conducting layer on the upper surface of the control sheet and overlying the at least one aperture, an upper question sheet overlying the electrically conducting layer on the control sheet and having at least one question imprinted thereon and indicia for selecting an answer, the control sheet and question sheet being coupled together in registration with each other and defining at least one opening therebetween through which the contact member is passable for electrically contacting the second electrically conducting layer. Further provided is an indicating light coupled in series circuit with the power source, the electrically conducting layers, and the contact member. When pressure is applied in the area of a correct answer indicia, the electrical circuit is completed from the power source, through the contact member and first and second electrically conducting layers which contact each other via the at least one aperture in the control sheet when the pressure is applied.

DETAILED DESCRIPTION

Figure 1:
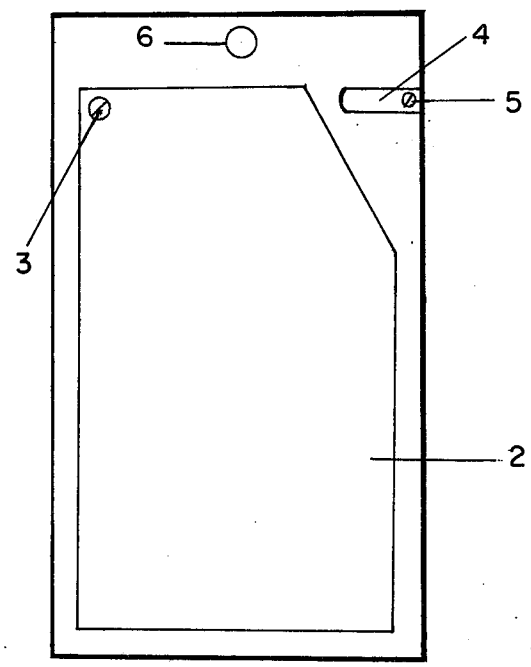
FIG. 1 is a front view of the teaching device of the present invention showing the indicator lamp assembly and the base member of the device.

FIG. 1 illustrates a base member 1 of rigid insulating material having a conducting sheet 2 mounted thereon. The conducting sheet is preferably a metallic sheet. A bolt, or the like, 3 passes through the metallic sheet 2 and through the base member 1 to the rear side thereof for making an electrical connection as will be described below with respect to FIG. 2. The base member 1 further has a metallic contact member 4 mounted thereto by means of a screw 5, or the like which passes through to the rear of the base member 1 for making an electrical connection as will be described below with respect to FIG. 2. The contact member 4 is spaced from the metallic sheet 2. An indicator lamp 6 is mounted in the base member.

Figure 2:
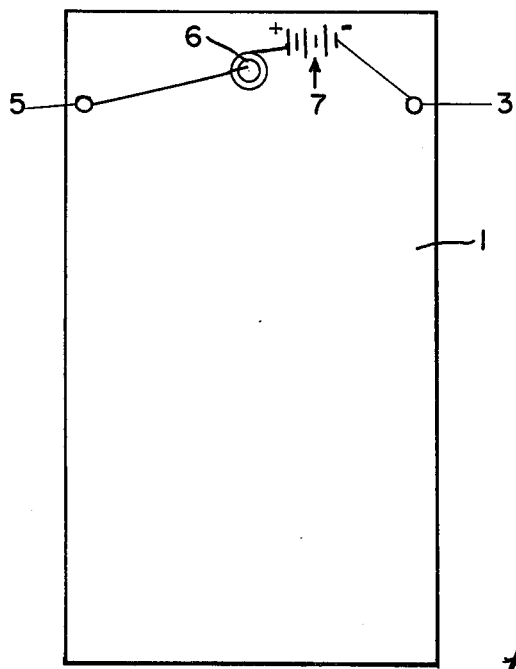
FIG. 2 is a rear view of the parts shown in FIG. 1, further showing the circuitry connecting a power source to the lamp assembly, to the contact member and to the metallic sheet on the base member.

Referring to FIG. 2, the indicator lamp 6 is connected to a power source 7 by means of a wire, the indicator lamp 6 being further coupled to the bolt 5 which is electrically connected to the contact member 4. The power source 7 is further coupled to the bolt 3 which is electrically connected to the metallic sheet 2. Thus, a series circuit is formed between the metallic sheet 2, bolt 3, power source 7, indicator lamp 6, bolt 5 and contact member 4.

Figure 3:
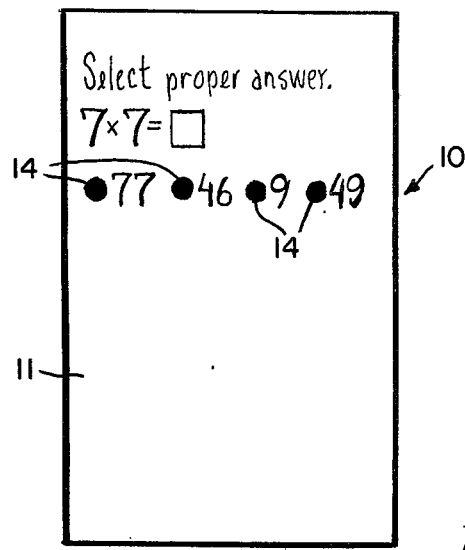
FIG. 3 is a front view of a question and answer folder showing a sample objective question.
Figure 4:
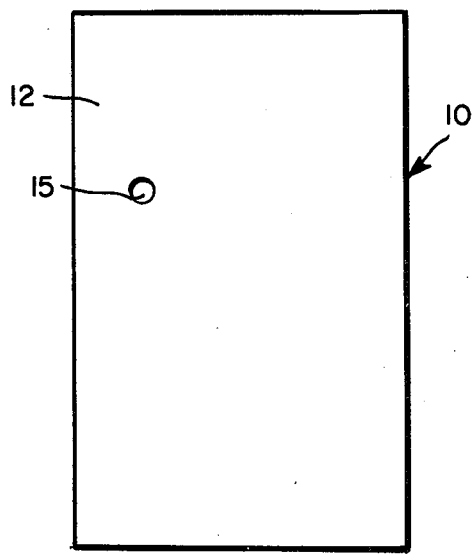
FIG. 4 is a rear view of the question and answer folder of FIG. 3 showing an aperture below and in registration with the correct answer indicia in the folder of FIG. 3.
Figure 5:
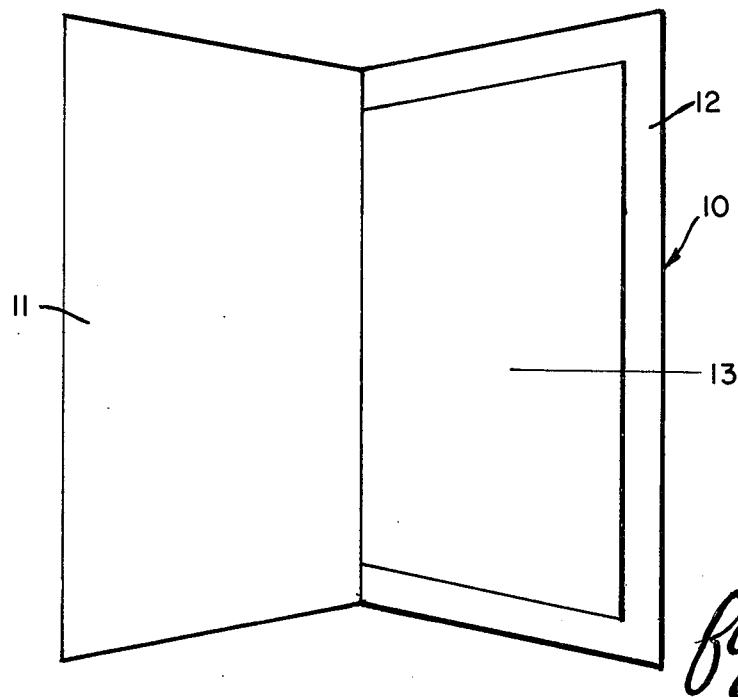
FIG. 5 is a view of a question and answer folder in the open position showing a metallic foil used therein to complete an electrical circuit.

FIGS. 3 and 4 are front and rear views, respectively, of a question and answer folder of the present invention. FIG. 5 is a perspective view of the folder in the open position. The front question and answer sheet 11 of the folder 10 has at least one question imprinted thereon and a plurality of possible answers and answer indicia 14 thereon. In the illustrated embodiment, the answer indicia are circles imprinted on the front sheet 11. Front sheet 11 is of insulating material. The question and answer folder 10 further includes a rear insulating control sheet 12 with an aperture 15 therein. The aperture 15 is arranged so that when the front and rear sheets 11 and 12 are folded on each other, the aperture 15 is in registration with the correct answer indicia 14 for the question imprinted on the front sheet 11. It should be clear that a plurality of questions and respective answers can be imprinted on the front sheet, with appropriate control apertures 15 on the rear sheet 12.

As shown in FIG. 5, a metallic sheet 13, such as a metallic foil, is mounted on control sheet 12 so as to be interposed between the front sheet 11 and the control sheet 12 when the folder is in its closed position.

Figure 6:
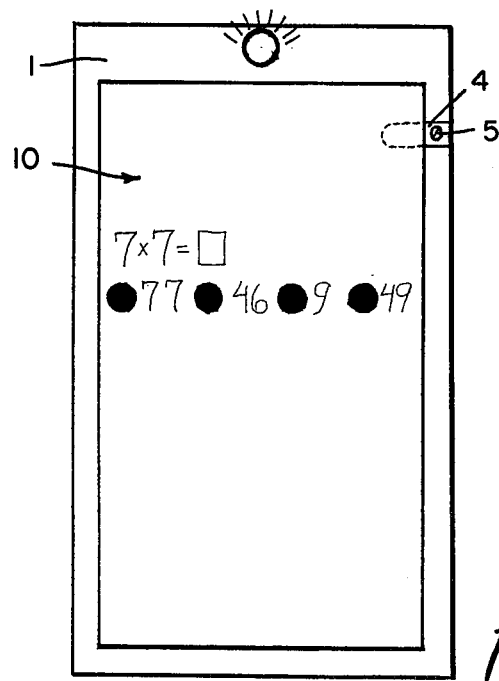
FIG. 6 is a front view of the teaching device of the present invention with the question and answer folder in working position with the metal clip of the base member in contact with the metal foil of the question and answer folder.

FIG. 6 shows the question and answer sheet 10 mounted on a base member 1. When mounting the question and answer sheet 10, the front sheet 11 is folded at least partially away from the control sheet 12 and the control sheet with the metallic foil 13 thereon is slid under the contact member 4 so that the contact member 4 makes electrical contact with the metallic foil sheet 13. The front question sheet 11 is then folded down on the control sheet 12 to close the folder as indicated in FIG. 6. Upon depressing the correct answer indicia 14 for the question imprinted on the question and answer sheet 10, the electrical circuit to the indicator light 6 is completed by means of pressing the metallic foil 13 through the control aperture 15 to contact the metallic sheet 2 on the base member 1. This causes the indicator light 6 to be illuminated, as indicated in FIG. 6.

As should be clear, the question and answer folder may be easily changed and mounted on the base member. This particularly renders the device of the present invention adaptable to any type of objective question, such as multiple choice, true, false, etc. Answer indication is easily given by finger pressure on the answer indicia on the question and answer folders.

I claim:

1. An electrical teaching apparatus comprising:
a substantially rigid electrically insulating base member;
a first electrically conducting layer partially covering a face of said base member;
an electrically conducting contact member on said base member, said contact member being spaced from and always out of contact with said first electrically conducting layer;
a source of power coupled between said contact member and said first electrically conducting layer;
an indicator light coupled in series circuit with said power source, said first electrically conducting layer and said contact member;
a question and answer member adapted to overlie said first electrically conducting layer and to engage said contact member, said question and answer member including an electrically insulating bottom layer control sheet which has at least one aperture therein; a second electrically conducting layer on the upper surface of said control sheet and overlying said at least one aperture; an upper electrically insulating question sheet overlying said second electrically conducting layer and having at least one question imprinted thereon and indicia for selecting an answer; said control sheet and question sheet being permanently coupled together at least along an edge thereof in registration with each other and with said at least one aperture in registration with a correct answer indicia, and defining at least one openable flap portion between said control sheet and question sheet, said contact member being passable through said openable flap portion for electrically contacting said second electrically conducting layer;
whereby when pressure is applied in the area of a correct answer indicia, an electrical circuit is completed to said indicator light from said power source, through said contact member and through said first and second electrically conducting layers which contact each other via said pressure in the vicinity of said at least one aperture in said control sheet.

2. An electrical teaching apparatus according to claim 1, wherein said question and answer member comprises a folder, said lower control sheet and upper question sheet being foldably connected together along at least one edge thereof to form said folder.

3. An electrical teaching apparatus according to claim 2, wherein said second electrically conducting layer is mounted on the surface of said lower control sheet which is interior of said folder.

4. An electrical teaching apparatus according to claim 2, wherein said folder is openable at least along one edge thereof for receiving said contact member between said upper question sheet and lower control sheet.

5. An electrical teaching apparatus according to claim 3, wherein said folder is openable at least along an edge thereof for receiving said contact member between said upper question sheet and lower control sheet and over said second electrically conducting layer so as to make electrical contact with said first electrically conducting layer when said contact member is received between said upper question sheet and lower control sheet.

6. A question and answer member for use in an electrical teaching apparatus having a first electrically conducting layer partially covering a face of an electrically insulating base member, and an electrically conducting contact member on said base member, said question and answer member being adapted to overlie said first electrically conducting layer and to engage said contact member, said question and answer member comprising:
an electrically insulating bottom layer control sheet which has at least one aperture therein;
a second electrically conducting layer on the upper surface of said control sheet and overlying said at least one aperture; and
an upper electrically insulating question sheet overlying said second electrically conducting layer and having at least one question imprinted thereon and indicia for selecting an answer;
said control sheet and question sheet being permanently coupled together at least along an edge thereof in registration with each other and with said at least one aperture in registration with a correct answer indicia, and defining at least one openable flap portion between said control sheet and question sheet for receiving said contact member through said openable flap portion and between said control sheet and question sheet for electrically contacting said second electrically conducting layer;
whereby when said question and answer member is mounted on said teaching apparatus to overlie said first electrically conducting layer and pressure is applied to said question sheet in the area of a correct answer indicia, an electrical circuit is completed through said contact member and through said first and second electrically conducting layers which contact each other via said pressure in the vicinity of said at least one aperture in said control sheet.

7. A question and answer member according to claim 6, wherein said upper question sheet and lower control sheet comprises a folder, said lower control sheet and upper question sheet being foldably connected together along at least one edge thereof to form said folder.

8. A question and answer member according to claim 7, wherein said second electrically conducting layer is mounted on the surface of said lower control sheet which is interior of said folder.

9. A question and answer member according to claim 8, wherein said folder is openable at least along an edge thereof for receiving said contact member between said upper question sheet and lower control sheet and over said second electrically conducting layer so as to make said electrical contact with said first electrically conducting layer when said contact member is received between said upper question sheet and lower control sheet.

10. A question and answer member according to claim 7, wherein said folder is openable at least along one edge thereof for receiving said contact member between said upper question sheet and lower control sheet.

* * * * *